No. 763,627. PATENTED JUNE 28, 1904.
J. M. PARMENTER & G. C. KOHLER.
HANDLE.
APPLICATION FILED APR. 1, 1904.
NO MODEL.
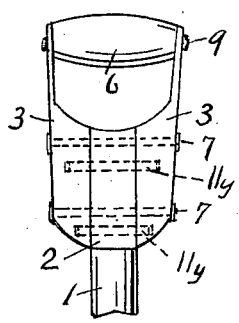
Fig. 5.
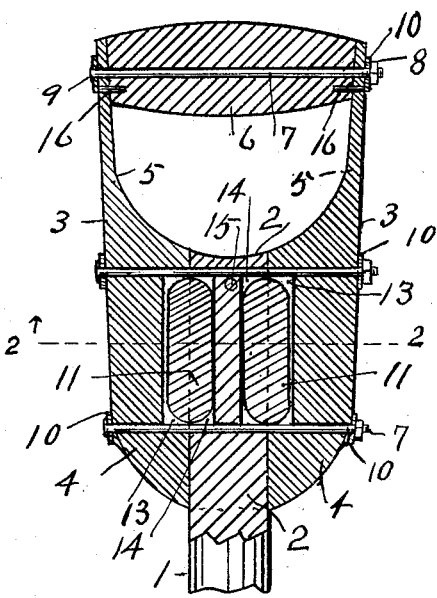
Fig. 1.
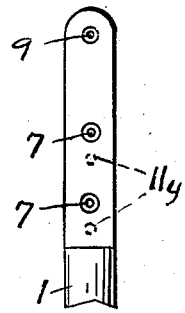
Fig. 6.
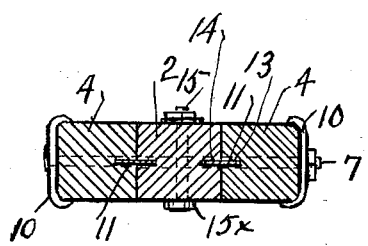
Fig. 2.
Fig. 4.
Fig. 3.
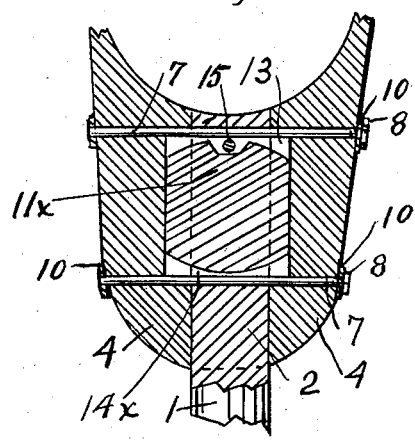
Witnesses
C. M. Catlin
Charles Baker
Inventors
J. M. Parmenter & G. C. Kohler,
By Benj. R. Catlin Attorney No. 763,627. Patented June 28, 1904.

UNITED STATES PATENT OFFICE.

JOSEPH M. PARMENTER AND GEORGE C. KOHLER, OF SIDNEY, OHIO.

HANDLE.

SPECIFICATION forming part of Letters Patent No. 763,627, dated June 28, 1904.

Application filed April 1, 1904. Serial No. 201,183. (No model.)

*To all whom it may concern:*

Be it known that we, JOSEPH M. PARMENTER and GEORGE C. KOHLER, residents of Sidney, in the county of Shelby and State of Ohio, have invented certain new and useful Improvements in Handles; and we do hereby declare the following to be a full, clear, and exact description of the invention, such as will enable others skilled in the art to which it pertains to make and use the same.

The invention relates to so-called D-handles for shovels and the like and to that class of handles that are made in sections; and its object is to provide a cheap, durable, and efficient handle of such class.

The invention consists in the construction hereinafter described and pointed out.

In the accompanying drawings, Figure 1 is a longitudinal section of a handle. Fig. 2 is a transverse section on line 2 2 of Fig. 1. Fig. 3 is a plan of a washer, and Fig. 4 is a longitudinal section of a modified form of handle. Fig. 5 is a side and Fig. 6 an edge elevation of a modification.

Numeral 1 denotes the stem, staff, or shank of a tool, such as a shovel, which at its upper end terminates, preferably, in a part or head 2 of rectangular form in cross-section and preferably square. Side sections of the handles are denoted by 3. These have each a part 4 suitably shaped and substantially as shown for combination with the stem-head. They are chamfered or cut out toward their upper ends, as represented at 5.

6 denotes the handle-grip. The stem-head, chamfered side sections, and grip are bolted or riveted together by bolts or rivets to form the handle in manner substantially as indicated in Fig. 1.

The bolts or rivets 7 may each have a screw-threaded end to receive a nut 8. Their opposite ends have heads or upset ends 9. Obviously both ends of the bolts could be upset or riveted and the nuts dispensed with; but we prefer to use the screw bolts and nuts.

10 indicates washers preferably shaped and curved, as represented, to closely fit the rounded side sections when the nuts 8 have been suitably screwed home or when both ends of the bolts have been upset or riveted, as the case may be.

The wooden parts may in practice be kiln-dried and boiled in oil to obviate shrinking; but the construction is such that shrinkage can be compensated for by tightening the nuts or by riveting.

The chamfered side pieces and the stem-head are further secured together by bracing or combination plates 11 inserted tightly in closed or concealed mortises 13 and 14, formed in the respective parts and extending lengthwise between two of the bolts 7. The said plates, which are preferably of oblong form, are concealed and securely held in the wood without transverse fastenings. Obviously they should not be of such thickness that when driven into the mortises they will split the wood. The mortises may, if desired, be made a trifle deeper than half the width of the plates. To strengthen the stem-head 2, a rivet 15 and washers $15^x$ can be used near its upper end and beyond the end of the mortise.

The brace-plates resist transverse displacement of the wooden sections. To secure this effect, narrow plates sufficiently wide to bridge the joints, but not extending entirely through either the head or sections, act efficiently while held in operative situation in closed or concealed mortises. They have comparatively little weight, and transverse securing-rivets or the like are avoided. They do not interfere with the tightening of the sections by the screw-bolts. Though a single plate extending entirely through the hood, as indicated in Fig. 4, with its edges entered in closed mortises 13 in the side pieces, would be operative, and according to our invention it is not preferred, because the head would be weakened without increase of effectiveness of the bracing and with increase of weight of metal. Pins $11^y$ may in some cases be substituted for plates.

16 denotes pins joining the grip and side sections in manner to prevent its rotation. These pins are not essential in all cases; but their use is preferred.

Obviously a wooden handle made in sections as herein set forth can be made with great economy of material, as the side members can be fashioned from narrow pieces and the stem and grip also and different kinds of wood can be used for the different parts, thus reducing the quantity required as a whole and also enabling the reduction of the rarer and more expensive kind of wood, if more than one is used.

We consider ash very suitable for the stem and grip and oak for the side sections; but the invention is not limited in this respect.

Having thus described our invention, what we claim as new, and desire to secure by Letters Patent, is—

1. In a handle, the combination of the wooden side sections, a central section consisting of the end of a wooden tool-staff, and bracing-plates situated in concealed mortises in the contiguous parts of the section.

2. In a handle, the combination of the wooden side sections, a central section consisting of the end of a wooden tool-staff, and bracing-plates situated in concealed mortises in a contiguous part of the sections, and a rivet extending through the central section near its upper end and transversely to the plane of the plates.

3. In a handle, the combination of three wooden sections connected by bolts, and bracing-plates held in concealed mortises and situated between the bolts and adjacent the contiguous surfaces of the sections.

4. In a handle, the combination of three wooden sections connected by bolts, and bracing-plates held in concealed mortises and situated between the bolts and adjacent the contiguous surfaces of the sections, said bolts being adapted to close the sections without disturbance of the plates when said sections are separated by shrinking or otherwise.

5. In a handle, the combination of three wooden sections connected by bolts, and bracing-plates held in concealed mortises and situated between the bolts and adjacent the contiguous surfaces of the sections, said mortises having an extra depth to provide for closing the sections when separated by shrinking.

6. In a handle, the combination of three wooden sections connected by bolts, and bracing-plates held in concealed mortises and situated between the bolts and adjacent the contiguous surfaces of the sections, said bolts having washers to hold the riveted ends of the bolts.

7. In a handle, the combination of three wooden sections connected by bolts, and bracing-plates held in concealed mortises and situated between the bolts and adjacent the contiguous surfaces of the sections, said bolts having washers to hold the riveted ends of the bolts, said washers being oblong and curved to fit curved surfaces of the outer sections.

8. In a handle, the grip, the bolt holding the grip in the handle and pins engaging the grip and handle to prevent the turning of the grip.

9. In a handle, the combination of three sections, bolts to hold them together widthwise of the handle, and means extending across the section-joint for preventing sidewise displacement of the sections, such means comprising devices concealed within the sections and freely movable to permit the tightening of the bolts, substantially as described.

In testimony whereof we have signed this specification in the presence of two subscribing witnesses.

JOS. M. PARMENTER.
GEORGE C. KOHLER.

Witnesses:
  LULU AILES,
  ADRIAN S. AILES.